United States Patent [19]

Williams, Jr.

[11] 4,227,543
[45] Oct. 14, 1980

[54] BLOWOUT PREVENTER

[75] Inventor: Leonard E. Williams, Jr., Houston, Tex.

[73] Assignee: Cameron Iron Works, Inc., Houston, Tex.

[21] Appl. No.: 934,832

[22] Filed: Aug. 18, 1978

[51] Int. Cl.³ .................. E21B 33/06; F16J 15/14
[52] U.S. Cl. .......................... 137/246.22; 251/1 A; 277/72 FM; 277/127
[58] Field of Search ............... 251/1 R, 1 A; 277/126, 277/127, 129, 72 FM; 137/246, 246.15, 246.16, 246.22

[56] References Cited

U.S. PATENT DOCUMENTS

| 1,861,614 | 6/1932 | Schweitzer | 277/129 X |
| 2,322,269 | 6/1943 | Allen | 251/1 |
| 4,050,700 | 9/1977 | Lifferth | 277/72 FM |

*Primary Examiner*—Martin P. Schwadron
*Assistant Examiner*—Richard Gerard
*Attorney, Agent, or Firm*—Vinson & Elkins

[57] ABSTRACT

A ram-type blowout preventer for use in the drilling of onshore and offshore wells, having secondary plastic injection sealing means whereby, on failure of the conventional ram seal, a well closure may still be ensured for protection of human life, equipment and the environment.

8 Claims, 4 Drawing Figures

BLOWOUT PREVENTER

BACKGROUND

After extensive use blowout preventers may not quite seal when they close. Such failure to seal may result from a damage to the packing face, from imperfections in the pipe extending through the blowout preventer or from the inclusion of trash. When such failure to seal occurs, it is desirable to have a way to seal obtained without retracting the rams and thereby losing control of the well. In some installations the preventers may be hundreds of feet below the water surface.

SUMMARY

The present invention relates to an improved blowout preventer having a secondary sealing system which can be used to stop leaking through the packing.

An object of the present invention is to provide an improved blowout preventer which assures sealing even when the packing sealing face has been damaged.

Another object is to provide an improved blowout preventer which has a secondary sealing capability available whenever there is a leak in the blowout preventer.

A further object is to provide an improved blowout preventer which increases safety and protection of the environment in its use by providing a means for assuring sealing after the packer has developed leakage.

BRIEF DESCRIPTION OF THE DRAWINGS

These and other objects and advantages are hereinafter set forth and explained with reference to the drawings wherein.

DESCRIPTION OF THE PREFERRED EMBODIMENTS

Figure 1:
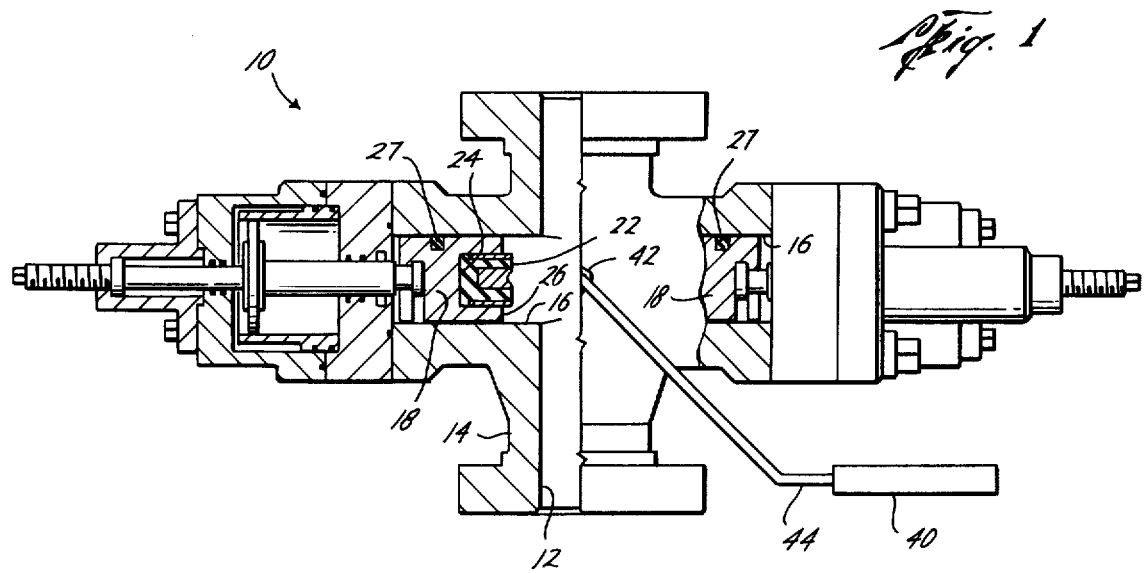
FIG. 1 is an elevation view of the improved blowout preventer of the present invention with portions thereof broken away to show some of the interior components.
Figure 2:
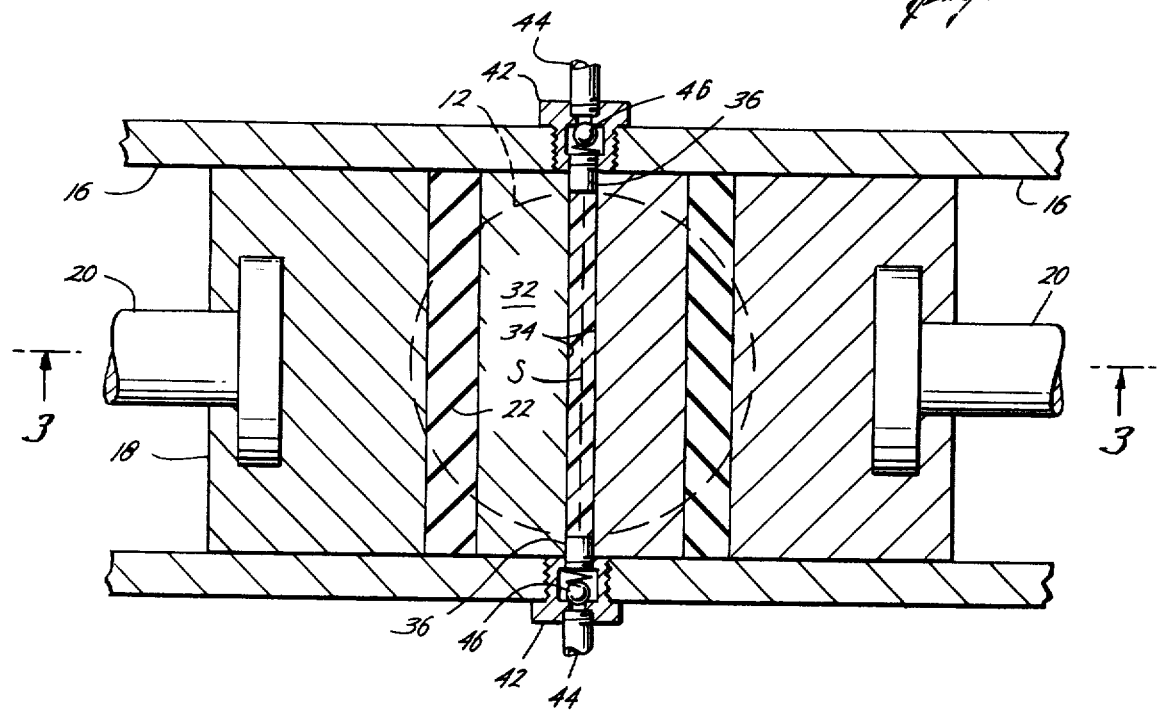
FIG. 2 is a transverse sectional view of a blind ram type of blowout preventer with the rams closed and the secondary packing sealant in place.
Figure 3:
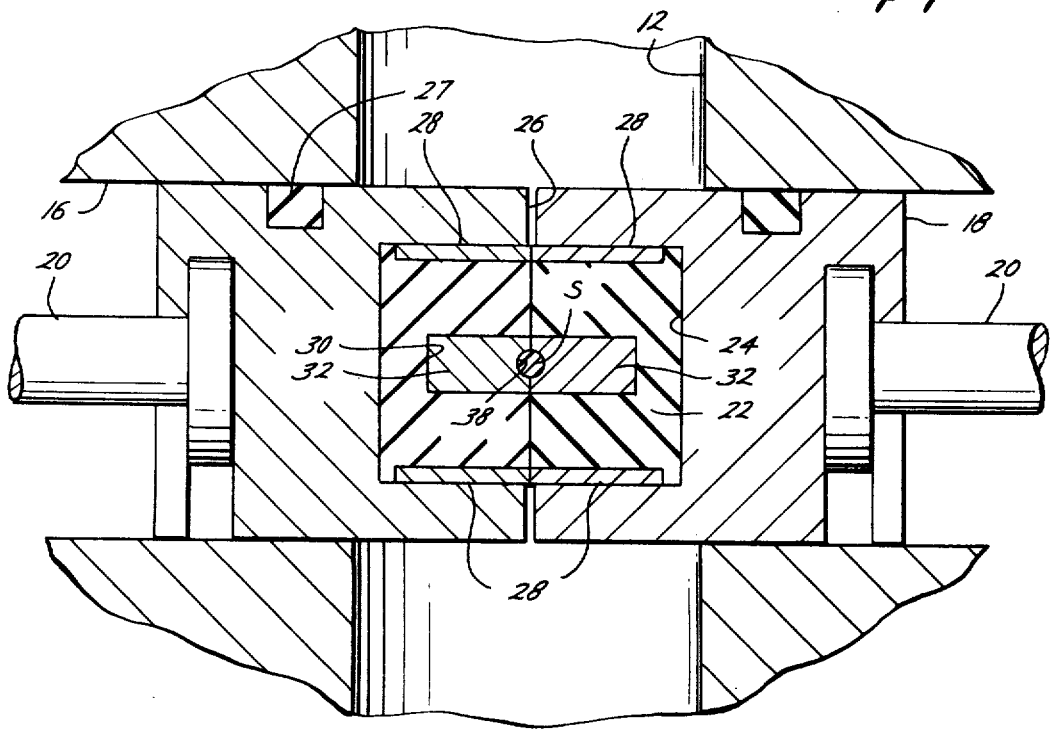
FIG. 3 is a sectional view of the blind ram type blowout preventer taken along line 3—3 in FIG. 2.

The improved blowout preventer 10 of the present invention, as shown in FIGS. 1, 2 and 3, is the blind ram type which seals the bore 12 when no pipe is positioned therein. Preventer 10 includes housing 14 through which bore 12 extends. Guideways 16 are aligned with each other and extend outward from bore 12 as shown. Rams 18 are slidably positioned in guideways 16 and are moved by suitable means, such as the usual pistons 19 which are connected to rams 18 by rods 20. Packing elements 22 are retained in the horizontal slots 24 extending transversely across face 26 of each of rams 18. Each ram 18 includes means 27 for sealing with its guideway. Metal inserts 28 are provided to reinforce and contain packing elements 22 against pressure when rams 18 are shut.

As shown in FIGS. 2 and 3, recess 30 extends across the face of each packing element 22. Resilient retainer 32 is positioned in recess 30 and includes groove 34 extending across its face. Grooves 34 communicate with ports 36 extending through housing 14 when rams 18 are closed. These grooves 34 coact to form a secondary sealant passage 38 which extends completely across pipe bore 12. This passage 38 is positioned to receive a secondary plastic sealant material which is forced through ports 36 by suitable pumping means (shown schematically in FIG. 1). The pump 40 has a suitable reservoir of the plastic sealant S and is connected to fitting 42 by tube 44. Fitting 42 is connected into housing 14 as shown in FIG. 2 and includes a check valve 46 to prevent outward flow therethrough. If desired, two of the fittings 42 may be connected into opposite sides of housing 14 as shown in FIG. 2 and the secondary sealant S injected through one or both fittings 42. A wide variety of devices may be used therefor. For example, in onshore installations, direct injector pumps similar to grease guns may be used and for offshore (submarine well head) applications a remotely controlled plastic injection device may be used.

Such secondary sealant S provides a back-up sealing system so that a seal may be achieved even if packing elements 22 do not seal on the closing of rams 18. While packing elements 22 may be expected to seal over many opening and closing cycles, a failure of such packing elements to seal and contain the well pressure for a sufficient time to bring well pressure under control can be catastrophic. Whenever packing elements 22 fail to seal properly, the plastic sealant S is pumped into sealant passage 38 to provide the pressure seal until the well pressure can be brought under control.

After use of the secondary sealant, the packing elements may at some time later be replaced so that the secondary sealing system is available at any time it is needed.

A suitable plastic sealant material for use with the present invention is a packing material sold by Utex Industries, Inc., under the designation Style 1908. Such material has been used in the past for sealing pack-off flanges.

Figure 4:
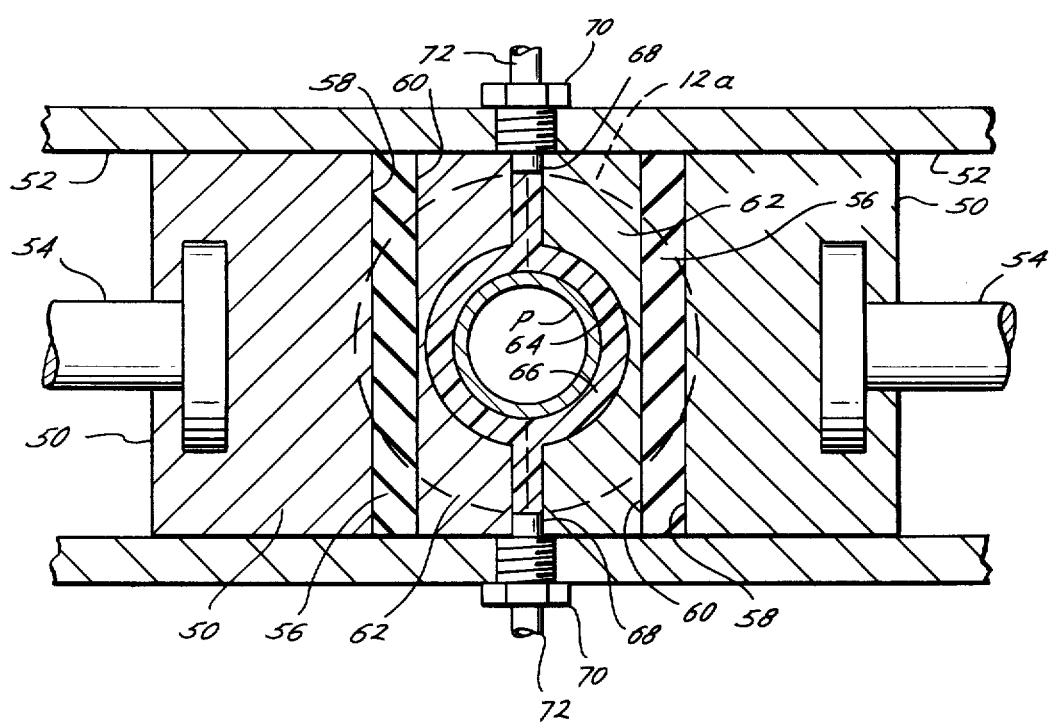
FIG. 4 is a transverse sectional view similar to FIG. 2 but of a blowout preventer adapted to close on pipe.

While the structure shown in FIGS. 1, 2 and 3 is shown to be a blind ram type adapted to seal with no pipe extending through the pipe bore 12, it may be adapted to rams for sealing around pipe P as shown in FIG. 4. The rams 50 slide in the guideways 52 and are connected to the pistons (not shown) by the connecting rods 54. The packing elements 56 are positioned in the front recesses 58 of rams 50 and each includes a recess 60 extending across its face. The retainers 62 are positioned in the recesses 60. The retainers 62 have grooves 64 extending across their faces and opposing grooves with rams 50 closed form the sealant passage 66. The face of the retainers 62 and the packing elements 56 are shaped to meet at the center of the pipe bore 12 and to seal against each other and around pipe P.

The sealant passage 66 extends across the pipe bore 12 and is in communication with ports 68 at each end. The fittings 70 are secured into the housing 14 and include the usual check valve (not shown) and are connected to a source (not shown) for pumping plastic sealant by the tubes 72. The sealant passage 66 extends around the pipe P as shown in FIG. 4 so that a complete secondary seal is provided by the introduction of the sealant S into the sealant passage 66.

Both forms of the present invention have the usual packing for ordinary sealing on closure of the rams. The retainers are resilient so that they do not interfere with the usual sealing function of the packing elements.

What is claimed is:

1. A blowout preventer, comprising a housing having a bore extending therethrough and opposed guideways intersecting the bore, a ram slidably mounted in each of said guideways, a packer positioned in the face of each of said rams, means for extending and retracting said rams to close the bore in their extended position with said packers providing a seal across the bore and to open the bore in their retracted position, each of said packers having a groove extending across its face transversely of said guideway, the grooves of the two packers forming a sealant passage when said rams are extended to closed position, and at least one injection fitting connecting through said housing in communication with said packer grooves when said rams are extended to a closed position, whereby a flowable sealant may be injected through said injection fitting into said sealant passage to provide a secondary seal and to assure a tight seal of said packers when said rams are extended to closed position.

2. A blowout preventer, comprising a housing having a bore extending therethrough and opposed guideways intersecting the bore, a ram slidably mounted in each of said guideways, a packer positioned in the face of each of said rams, means for extending and retracting said rams to close the bore in their extended position and to open the bore in their retracted position, each of said packers having a recess extending across its face transversely of said guideway, a resilient retainer positioned in said packer recess, having a groove extending along its face, the grooves of the two retainers forming a sealant passage when said rams are extended to closed position, and at least one injection fitting connecting through said housing in communication with said retainer grooves when said rams are extended to a closed position, whereby a flowable sealant may be injected through said injection fitting into said sealant passage to assure a tight seal of said packers when said rams are extended to closed position.

3. A blowout preventer according to claim 2, including means for injecting said flowable sealant through said injector fitting.

4. A blowout preventer according to claim 2 wherein said rams are blind rams adapted to seal across said bore when no pipe is positioned therein.

5. A blowout preventer according to claim 2 wherein said packers have pipe recesses on their faces whereby said packers are adapted to seal across said bore and around a pipe positioned therein.

6. A blowout preventer ram packing comprising a resilient packer having a face adapted to seal against the face of an opposed packer and a recess extending along the face of the packer, and a resilient retainer positioned within the packer recess and having a face and a groove extending along its face, the retainer groove coacting with a groove in the retainer of an opposed packer to define a sealant passage into which sealant may be introduced to provide a secondary sealing system for assuring a pressure tight seal along the face of opposed packers in closed position.

7. A blowout preventer ram packing according to claim 6 wherein said packing face and said retainer face are straight and form a blind ram packing.

8. A blowout preventer ram packing according to claim 6 wherein said packing face and said retainer face have concave recesses therein whereby said packing and said retainer are adapted to seal against a pipe.

* * * * *